United States Patent [19]

Simmons

[11] Patent Number: 5,471,029
[45] Date of Patent: Nov. 28, 1995

[54] WATER COOLED RESISTANCE WELDING ASSEMBLY

[75] Inventor: Michael S. Simmons, Greer, S.C.

[73] Assignee: Tuffaloy Products, Inc., Greer, S.C.

[21] Appl. No.: 278,821

[22] Filed: Jul. 22, 1994

[51] Int. Cl.[6] .................................................. B23K 11/30
[52] U.S. Cl. .................. 219/120; 219/86.24; 219/86.31
[58] Field of Search ............................. 219/86.24, 86.31, 219/93, 120

[56] References Cited

U.S. PATENT DOCUMENTS

| 2,186,319 | 1/1940 | Bilton | 219/120 |
|---|---|---|---|
| 2,409,550 | 10/1946 | Dobkowski | 219/4 |
| 2,422,962 | 6/1947 | Hensel et al. | 219/4 |
| 2,443,966 | 6/1948 | Seeloff | 219/4 |
| 2,794,900 | 6/1957 | Width | 219/120 |
| 3,215,811 | 11/1965 | Kroy et al. | 219/120 |
| 3,558,847 | 1/1971 | Width | 219/87 |
| 4,788,407 | 11/1988 | Flater | 219/120 |

FOREIGN PATENT DOCUMENTS

| 735039 | 5/1966 | Canada | 219/120 |
|---|---|---|---|
| 5161979 | 6/1993 | Japan | 219/93 |
| 946852 | 8/1982 | U.S.S.R. | 219/120 |
| 1197809 | 12/1985 | U.S.S.R. | 219/120 |

Primary Examiner—Teresa J. Walberg
Assistant Examiner—J. Pelham
Attorney, Agent, or Firm—Reising, Ethington, Barnard & Perry

[57] ABSTRACT

A water cooled resistance welding assembly includes a tubular housing with an internal coolant system for efficiently removing heat from the inboard surface of a flat faced electrode for resistance welding either studs or nuts.

13 Claims, 2 Drawing Sheets

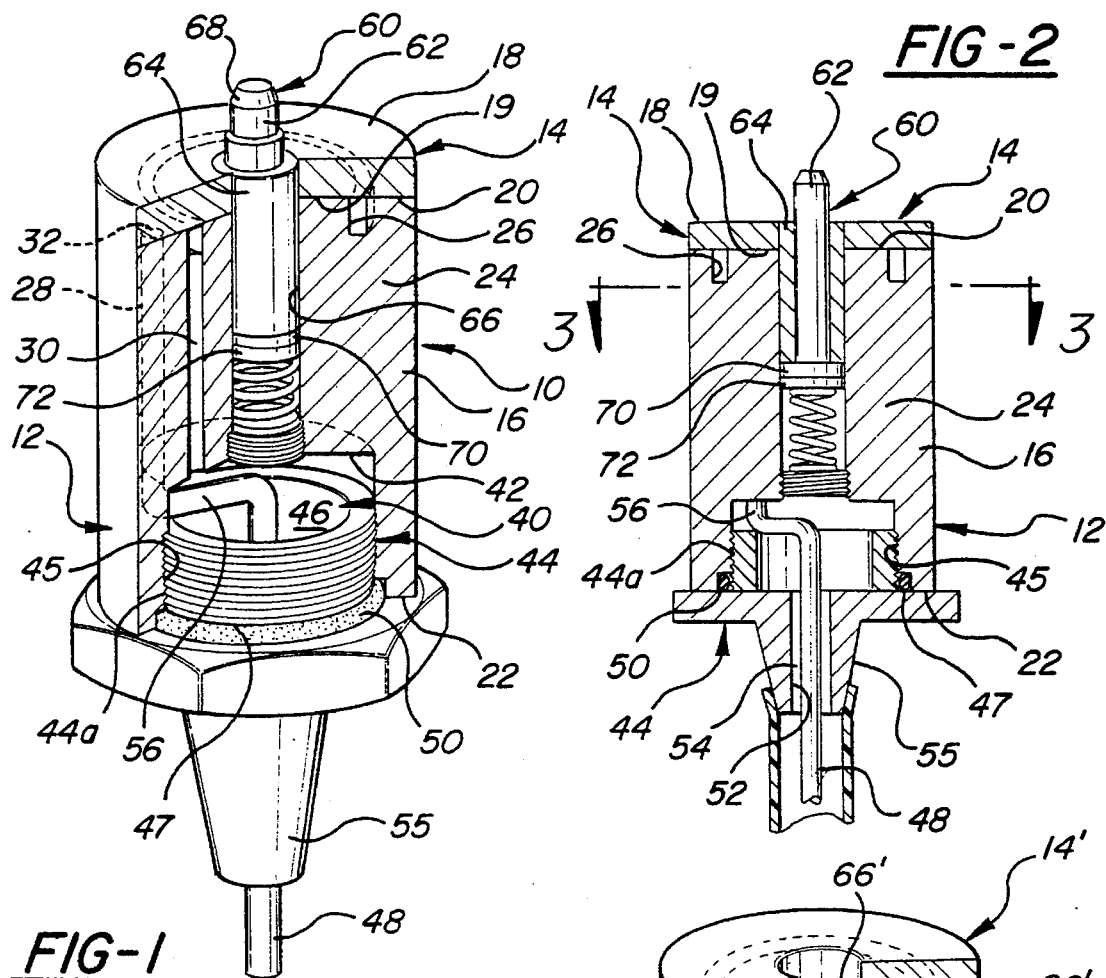
FIG-1
FIG-2
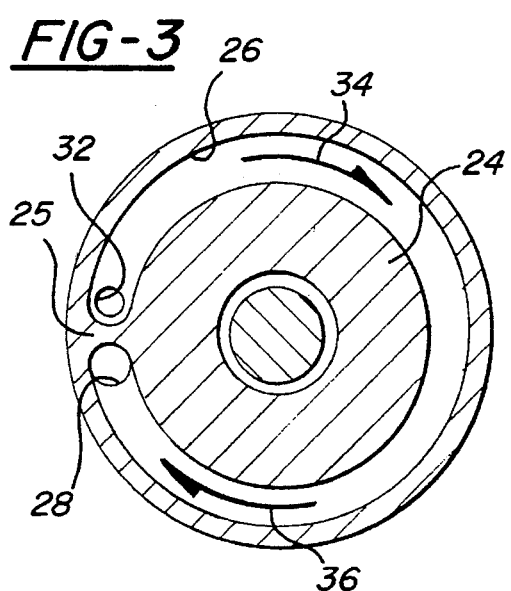
FIG-3
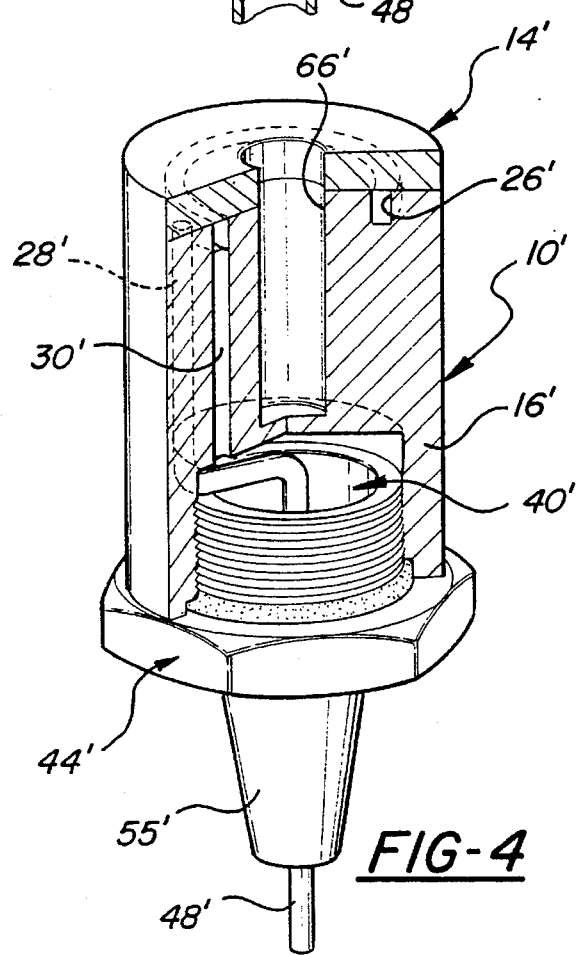
FIG-4

5,471,029

WATER COOLED RESISTANCE WELDING ASSEMBLY

FIELD OF THE INVENTION

This invention relates to water cooled resistance welding electrodes and more particularly to water cooled resistance welding electrodes having a ring shaped, flat faced electrode for completing a welding current path across a flat thin plate and a stud or a nut for resistance welding the stud or nut to the plate.

BACKGROUND OF THE INVENTION

A stud and nut electrode welding electrode assemblies is shown in U.S. Pat. No. 3,504,159 commonly assigned with the present application. The electrode assembly includes a holder for a stud and nut electrode tip. One problem with such prior art tips is that the electrode includes a flat face that engages either the stud or nut having weld projections thereon that create points of resistance on the thin plate at which a weld nugget is produced to secure the stud or nut to the thin plate. Such projection welding applications impose a substantial loading on the electrode tip during the welding cycle. In order to increase the durability of such electrode configurations applicant has developed a ring shaped electrode hard copper tungsten material to reduce electrode wear in such projection welding applications. The holder includes an external cooling jacket that is arranged around the outer periphery of an electrode tip supported within a cavity formed within the holder that is suitable for use with all copper holders and electrode tips. However, in the case of high strength electrodes the alloys that provide such strength conduct less electricity during the welding cycle so that higher energy is required to produce welding current. The increased electrical energy is released as heat at the weld face. Such heat causes higher electrode temperatures that can result in expulsion that in turn will adversely affect the characteristics of the weld nugget that is formed between the projections on either the stud or the nut and the thin plate.

U.S. Pat. No. 3,558,847, also commonly assigned with the present application, discloses a welding electrode holder that holds two spaced electrodes in a manner that will balance the force contact therebetween. The '847 holder includes a water tube that directs inlet cooling water into a cavity formed within one electrode and thence through internal passages to a second electrode cavity for return through a water tube to an outlet orifices supported by the holder. While suitable for its intended purpose, the cooling system in the '847 patent is not configured to cool electrodes suitable for projection welding of studs and nuts to thin metal plates wherein a wear resistant, high conductivity ring type electrode builds up heat during welding cycles.

SUMMARY OF THE INVENTION

An object of the present invention is to provide a welding electrode for connecting studs or nuts to a thin sheet wherein the welding electrode has a cooling system for maintaining the temperature of the electrode relatively constant during repetitive welding operations.

Another object of the present invention is to provide a high strength, wear resistant electrode for projection welding of nuts or studs to thin sheets in which metal will not be expelled during the welding cycle.

Another object of the present invention is to provide a welding electrode assembly for welding nuts or studs to a thin sheet that includes an improved cooling system having an annular passage on the inner surface of a ring shaped electrode; an inlet passage and an outlet passage communicating with the annular passage and a divider for directing the coolant flow from the inlet passage to the outlet passage for maintaining a continuous vortex flow across the inner surface of the ring shaped electrode on either side of the divider.

Still another object of the present invention is to provide a welding electrode assembly for welding nuts or studs to a thin sheet wherein the assembly includes a tubular housing and a ring shaped welding electrode having a flat outer surface and an inner surface connected to the tubular housing and wherein the tubular housing includes an annular cooling channel closed by the inner surface of the ring shaped welding electrode so as to define a sealed annular passage for flow of water therethrough for removing heat from the electrode so as to maintain the operating temperature of the flat outer surface of the electrode relatively constant during repetitive welding operations.

Another object of the invention is to provide the welding electrode assembly of the preceding object wherein the tubular housing includes a coolant inlet passage having a flow area less than the flow area defined through the annular passage for producing a fluid jet and wherein the tubular housing includes a coolant return passage having a flow area equal or greater than the flow area defined through the annular passage for reducing pressure drop in the coolant return path through the second open ended passage and the coolant inlet passage having an outlet that projects the fluid jet against the inside surface of the ring shaped electrode at one side of the annular passage for producing a coolant swirl within the annular channel against the inside surface of the ring shaped electrode.

Still another object of the present invention is to provide a welding electrode assembly for welding nuts or studs to a thin sheet wherein the assembly includes a tubular housing having first and second ends and an integral wall portion including first and second open ended openings directed through the integral wall portion longitudinally of the tubular housing; the tubular housing having an annular channel formed therein at the first end so as to intersect both the first and second open ended openings; a ring shaped welding electrode having a flat outer surface and an inner surface connected to the first end for closing the annular channel so as to define a sealed passage for flow of coolant therethrough between the first and second open ended openings; a thread on the second end and a threaded plug connected to the thread connection; the tubular housing having an internally located surface thereon in spaced relationship with the plug for forming a coolant return cavity; a coolant inlet tube directed through the plug in spaced relationship with the plug for forming an annular return passage therebetween in communication with the cavity; the coolant inlet tube extending exteriorly from the plug and adapted to be connected to a coolant source; the coolant inlet tube connecting to the first open ended opening for supplying coolant thereto; the first open ended opening defining a coolant inlet passage having a flow area less than the flow area defined through the annular passage for producing a fluid jet; the second inlet passage having a flow area equal or greater than the flow area defined through the annular passage for reducing pressure drop in the coolant return path through the second open ended passage; the first inlet having an outlet that projects the fluid jet against the inside surface of the ring shaped electrode at the sealed passage; the sealed passage thereafter producing a coolant swirl against the inside surface of the ring shaped electrode at the annular channel that is returned through the second open ended opening and through the annular coolant return path.

Advantages of the invention include maintaining a relatively constant temperature or temperatures within a narrow temperature band at the load bearing surfaces of a flat faced electrode for welding nuts or studs to a thin plate whereby repetitive welding cycles with good weld nugget quality can be achieved.

BRIEF DESCRIPTION OF THE DRAWINGS

Other advantages, objects and features of the present invention will become more apparent to those skilled in the art from the following detailed description of the invention taken in conjunction with the accompanying drawings wherein:

FIG. 1 is a perspective view of a stud and nut welding assembly of the present invention;

FIG. 2 is a longitudinal sectional view of the assembly of FIG. 1;

FIG. 3 is a sectional view taken along the line 3—3 in FIG. 2, looking in the direction of the arrows;

FIG. 4 is a perspective view like FIG. 1 showing another embodiment of the invention;

DETAILED DESCRIPTION OF PREFERRED EMBODIMENTS OF THE INVENTION

Figure 5:
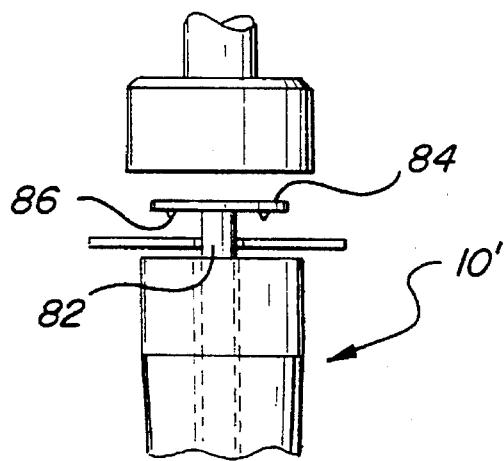
FIG. 5 is an exploded view of the present invention for welding a stud through sheet metal by resistance welding therebetween.

Referring now to FIG. 1 a stud and nut resistance welding assembly 10 is illustrated including a holder 12 and an electrode 14. The holder 12 has a tubular housing 16 and the electrode 14 has a load bearing flat face 18 and an inboard surface 19. The electrode 14 is made of a hard copper-tungsten material with low thermal conductivity. In accordance with one aspect of the present invention, the electrode 14 is preformed separately of the tubular housing 16 that is preferably formed from copper material. The tubular housing 16 has first and second ends 20, 22 formed at opposite ends respectively of an integral wall portion 24. The integral wall portion 24 includes an annular channel 26 formed therein at the first end 20. The integral wall portion 24 further includes a pair of closely spaced, open ended coolant openings 28, 30 directed through the integral wall portion 24 longitudinally of the tubular housing 16 to intersect the annular channel 26 on either side of a divider 25 therein.

The annular cooling channel 26 is closed by the inboard surface 19 of the electrode 14 so as to define a sealed passage for flow of water therethrough for removing heat from the electrode 14 so as to maintain the operating temperature of the flat face 18 relatively constant during repetitive welding operations.

Another feature of the invention is that the electrode has its inner surface 19 bonded to the first end 20 for closing the upper open end of the annular channel 26 so as to define a sealed passage 26a for flow of water therethrough between said first and second open ended water openings. The water opening 28 defines a coolant inlet passage having a flow area less than the flow area defined through the sealed passage 26a formed by the annular channel and the inboard surface 19 of the electrode 14. The opening 30 defines a coolant return passage having a flow area equal or greater than the flow area defined through the sealed passage 26a for reducing pressure drop in the coolant return path through said coolant return passage.

By virtue of this arrangement of flow areas, and as best shown in FIG. 3, the coolant inlet passage has an outlet 32 arranged and configured to project a coolant jet against the inboard surface 19 of the flat faced electrode 14 at one side of the annular channel 32. The divider 25 directs flow of coolant to produce a vortex like coolant swirl shown by arrows 34, 36 against the inboard surface 19 where it is directly exposed to the channel 26. The vortex flow discharges through the larger flow area at the inlet 38 to the water opening 30.

A coolant system 40 that supplies and returns coolant between the open ended water openings 28, 30 is defined by an internally located surface 42 on the tubular housing 16 that is located in spaced relationship with a sealing plug 44 having an external thread 44a. The external thread 44a is threadably connected to an internal thread 45 formed on the second end 22. The plug 44 has a groove 47 formed therein that receives an O-ring seal 50. The O-ring seal 50 is compressed between the plug 44 and the second end 22 to seal therebetween to prevent leakage from a coolant return cavity 46 formed between the inboard end 44b of the plug and the internally located surface 42. A coolant inlet tube 48 is directed through the plug 44 and is located in spaced relationship with the wall of a bore 52 formed through the plug 44. The tube 48 and bore 52 form an annular return passage 54 therebetween in communication with the cavity 46. A tubular integral extension 55 on plug 44 is adapted to connect to a coolant return. One end of the coolant inlet tube 48 extends exteriorly of the plug 44 and is adapted to be connected to a coolant source such as cooling water. The opposite end of the tube 48 has a bend 56 connected to the lower end of the water opening 28 for supplying coolant thereto.

The electrode 14 forms a ring having an outer diameter 14a that is the same as the O.D. of the housing 16. The arrangement defines a flat electrode face 18 at the upper end of the assembly 10 shown in FIGS. 1 and 2 for supporting either a stud or a nut in alignment with a face of a sheet metal part and opposed to a second electrode for directing resistance welding current through either the stud or nut for resistance welding either the stud or nut to the sheet metal part.

Figure 7:
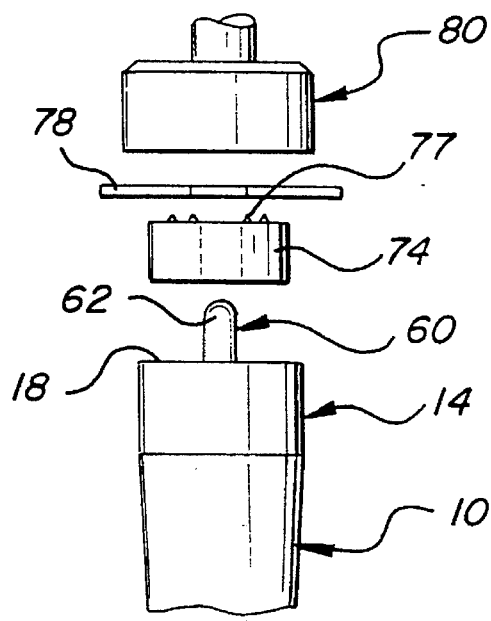
FIG. 7 is an exploded view of the present invention for resistance welding a self-piloted nut with a hole in sheet metal.
Figure 8:
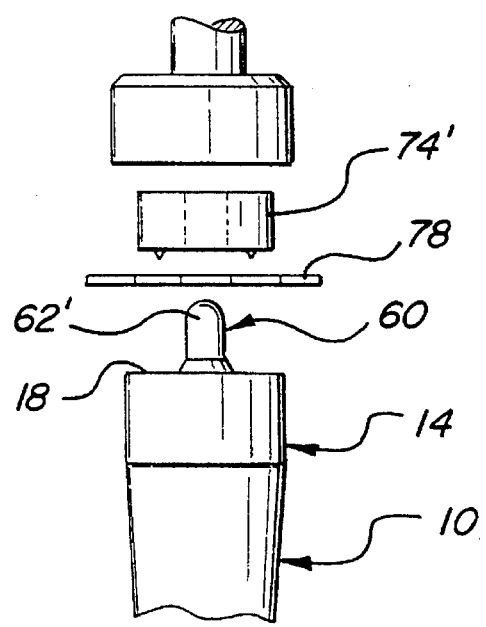
FIG. 8 is an exploded view of the present invention for guiding a non-self piloting nut with respect to a hole in the sheet metal.

In the embodiment of FIGS. 1–3, a nut locator subassembly 60 is provided. It includes a locator pin 62 slidably supported within a bushing 64 that is coated with an electrically insulating ceramic material. The bushing 64 is press fit within a central bore 66 of the housing 16. The pin 62 has a tapered head 68 and a flanged end 70 that engages a electrical insulating washer 72 that is spring biased against the flanged end 70 by a compression spring 73 so as to bias the pin 62 outwardly of the bushing 64 for locating the tapered head 68 within a nut. As shown in FIG. 7, the arrangement will enable a nut 74 with resistance welding projections 76 and a pilot portion 77 to be self aligned through a hole in a sheet metal part 78. In this cased an upper electrode 80 engages one side of the thin plate 78, the welding projections engage the other side thereof and the flat face 18 of the electrode engages the bottom of the nut. The nut 74 is aligned on the locator pin 62. Weld pressure and current is applied across the flat face 18 and the electrode 80 so as to cause the projections 76 to heat up and flow into the metal of the sheet metal to produce a weld nugget that bonds the nut to the sheet metal. In the FIG. 8 embodiment, the position of a nut 74' is reversed with respect to the sheet metal 78 and the pilot portions are omitted. In this case, the nut is guided by a locator pin 62' passing through the sheet metal hole and the nut.

Figure 6:
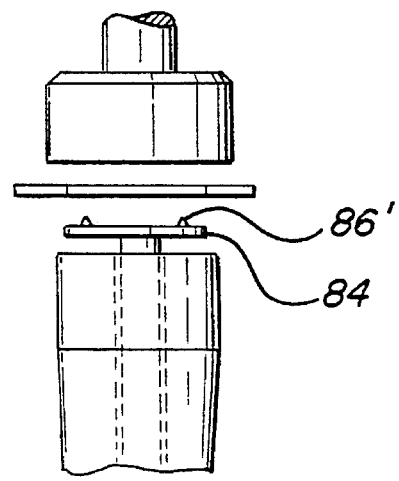
FIG. 6 is an exploded view of the present invention for welding a stud directly to the face of sheet metal for resistance welding therebetween.

In the embodiment of the invention shown in FIG. 4, the nut locator subassembly is eliminated. Otherwise, the resistance welding electrode assembly includes like components to those previously described in the embodiment of FIGS. 1–3 that are designated by like reference numerals, hyphenated. The embodiment of FIG. 4 is used in FIGS. 5 and 6 is associated with a stud 82 having a flange 84 on one end with resistance welding projections 86. In these embodiments, the stud 82 is seated in the central bore 66'. In FIG. 6, a flange 84' and projections 86' are located on the underside of the sheet metal, and in FIG. 5, the flange and projections are arranged on the upper surface of the sheet metal. Otherwise the weld pressure, current and cooling functions are as described with respect to the previously described embodiments of the invention.

The above-described welding electrode assemblies of the present invention are especially suited for resistance welding either a nut or a stud having welding projections thereon to a sheet metal piece. In such resistance welding processes, the projections provide the sole current path for the resistance welding current. The projections will pass into a liquid phase and the upper mechanism electrode must be moved fast enough to maintain the welding current path while maintaining pressure to assure bonding between the parts that are being resistance welded together. In the case of projection welding it has been found desirable to use a copper-tungsten material RWMA, e.g., RWMA 75% tungsten and 25% copper, to resist the highly localized heat and high pressures that occur between the projections and the electrode during the welding process. The Class 11 material types have a hardness of 94 Rockwell B as compared to CDA 182 materials, e.g., copper 99.14%, chrome 0.85%, silicon 0.01% with a Rockwell B hardness of 75. Accordingly, it has been assumed that the Class 11 materials resist wear better than those materials that do not include tungsten content. It has been observed that the purported wear resistant properties of copper-tungsten may detract from the life of such electrodes. The reduced life is believed to be attributable to the fact that such Class 11 material has a lower thermal conductivity than CDA 182 material. Such decreased thermal conductivity increases the level of heat buildup that occurs in such electrodes during repetitive welding operations. The heat build-up is believed to exceed the heat build-up in a CDA 182 electrode by a factor of 60% and is primarily due to the increased energy that is required to pass the resistance welding current through the copper tungsten material. Also, such copper tungsten material has a lower ability to conduct heat to a cooling system. In typical face type electrodes for nuts and studs the Class 11 material has a heat conduction rate of 110 BTU/[HR/FT/F°] as compared to CDA 182 material of 187 BTU/[HR/FT/F°] which is 40% less. Such properties cause the purported harder and resistant electrodes to remain at higher temperatures during repetitive welding operations. Higher temperatures, over time, cause the face material of the electrode to soften so as to cause deformation of the shape of the electrode.

Prior art cooling systems did not solve the problem of higher temperature operation at the face of the electrode because the prior art cooling systems provided only shell cooling or provided cooling at a point offset from the wear surface by a considerable distance. Consequently, the delta T variable was lower in either [conductive heat transfer=heat flow rate/(cross section area$\times(T_1-T_2$/heat flow] or [forced convection heat transfer=convective surface coefficient$\times$ surface area$\times(T_{fluid}-T_{solid})$]. Thus, it has been observed that, because of copper-tungsten electrode having low capabilities of transferring heat, the contact area of the electrode will continue to elevate in temperature to 1,100° F. and greater during repetitive welding cycles. Such temperature gradients in the weld contact temperature effects the difference in the size and characteristics of the weld nugget from weld to weld because the residue of heat is transferred back to the sheet metal being joined to either a stud or a nut since the sheet metal typically has a better heat transfer than the electrode and is at a lower static temperature from the 1st to 50th weld, for example.

In the present invention these problems are solved by the arrangement of the open end passages 28, 30 and the cooling system 40. By virtue of the arrangement shown in FIGS. 1–3, the cooling media is flowed directly under the copper-tungsten face electrode 14 at a distance that is typically only ¼ inch from the point that the weld contact area exists. The cooling media is directed through the water inlet tube 48 to the inlet end of the passage 28. Thence coolant flow is upwardly through the housing 16 where, because of the aforedescribed differences in flow area will be directed as a water jet against the surface 19 at the weld contact area. The flow is directed as shown in FIG. 3 to flow in a vortex fashion to the larger flow area opening 38. Such a flow pattern increases the flow rate of the cooling media, therefore increasing the rate of heat transfer from the copper-tungsten material of the face electrode 14. The heated cooling media is then returned from the inboard surface 19 of the electrode through the open ended passage 30, the return cavity 46, the annular passage 50 and out of the cooling system 40.

Such cooling of the face electrode 14 limits the gradient heat slope angle substantially so as to allow for a stronger correlation between the quality of the weld nugget created in the 1st weld to the last weld in a repetitive welding operation. While this value varies widely in different applications, the present invention typically maintains no more than a 23% temperature change after the first three repetitive welds. In addition to maintaining good weld quality, the present invention increases the life of electrodes since the upper limit on heat build-up results in greater linear strength that in turn reduces softening and deformation of the electrode face 18.

What is claimed is:

1. A welding electrode assembly for welding nuts or studs to sheet metal that includes an electrode with a flat outer surface and an inner portion seated in a housing having a cooling system for removing heat from the electrode characterized by: said electrode having a flat inboard surface; said housing having an annular passage at said inboard surface of said electrode; said housing further including longitudinally directed inlet and outlet passages communicating with said annular passage at spaced locations thereon; a divider provided along said annular passage between said inlet and outlet passages for directing flow from said inlet passage to said outlet passage in one direction only along said annular passage for maintaining a continuous vortex flow across said flat inboard surface.

2. The welding electrode assembly of claim 1 further characterized by a tubular housing and said welding electrode preformed separately of said tubular housing and wherein said tubular housing includes an annular cooling channel closed by said inboard surface so as to define a sealed passage for flow of water therethrough for removing heat from said electrode so as to maintain the operating temperature of the flat outer surface of said electrode within a desired temperature range.

3. The projection welding electrode assembly of claim 1 or claim 2 wherein the tubular housing includes a coolant inlet passage having a flow area less than the flow area defined through said annular passage and wherein said tubular housing includes a coolant return passage having a flow area equal or greater than the flow area defined through said annular passage for reducing pressure drop in the coolant return path through said coolant return passage and the coolant inlet passage having an outlet that projects a fluid jet against said inboard surface of the flat faced electrode at one side of the annular channel for producing a water swirl within the annular channel against said inboard surface of said electrode.

4. The projection welding electrode assembly of claim 1 or claim 2 wherein said electrode is a ring member for supporting either a stud or a nut in alignment with a face of a sheet metal part and opposed to a second electrode for directing resistance welding current through either the stud or nut for resistance welding either the stud or nut to the sheet metal part; said tubular housing having first and second ends; said tubular housing having an integral wall portion and said coolant inlet passage and said coolant return passage respectively being first and second open ended water openings directed through said integral wall portion longitudinally of said tubular housing; said annular channel formed in said first end so as to intersect both said first and second open ended water openings; said ring member having an inner surface connected to said first end for closing said annular channel so as to define a sealed passage for flow of coolant therethrough between said first and second open ended water openings.

5. The projection welding electrode assembly of claim 4 having a thread connection on said second end and a plug connected to said thread connection; said tubular housing having an internally located surface thereon in spaced relationship with said plug for forming a coolant return cavity; a coolant inlet tube directed through said plug in spaced relationship with said plug for forming an annular coolant return passage therebetween in communication with said cavity; said coolant inlet tube extending exteriorly from said plug and adapted to be connected to a cooling water source; said coolant inlet tube connecting to said first open ended water opening for supplying coolant thereto; said first open ended water opening defining a coolant inlet passage having a flow area less than the flow area defined through said annular passage for producing a water jet; said second inlet passage having a flow area equal or greater than said flow area defined through said annular passage for reducing pressure drop in the coolant return path through said second open ended passage; said first inlet having an outlet that projects said fluid jet against said inboard surface; said annular channel thereafter producing a water swirl against said inboard surface at said annular channel that is returned through said second open ended water opening; through said coolant return cavity and through said annular coolant return path.

6. The water cooled resistance welding assembly of claim 5 further characterized by said first and second open ended water openings being formed adjacent one another; and a divider formed therebetween for directing the water flow through said annular channel from said first open ended water opening to said second open ended water opening.

7. The water cooled resistance welding assembly of claim 5 further characterized by said plug having a threaded end threadably connected to said second end; said plug having an integrally formed tubular extension thereon adapted to be connected to a water return tube.

8. The water cooled resistance welding assembly of claim 5 further characterized by said ring member comprised of copper-tungsten material.

9. The water cooled resistance welding assembly of claim 5 further characterized by said tubular member having a central opening therethrough having a locator pin supported for relative reciprocation with respect to said tubular member and an insulating bushing supported between said tubular member and said locator pin; said insulating pin having a ceramic coating for electrically insulating said locator pin from said ring electrode.

10. The water cooled resistance welding assembly of claim 9 further characterized by said central opening having a plug in one end thereof and a spring for biasing said locator pin exteriorly of said central opening; said insulating bushing being press fit within said tubular member and a stop flange on said locator pin engageable with said insulating bushing for defining a stop to limit movement of said locator pin against the biasing action of said spring.

11. The water cooled resistance welding assembly of claim 10 further characterized by said plug having an external thread and said tubular housing having an internal thread connected to said external thread; a seal groove supported on said plug outboard of said external thread and an annular O-ring seal supported within said seal groove compressed between said plug and said second end for sealing against water leakage from said coolant return cavity.

12. The water cooled resistance welding assembly of claim 1 further characterized by said electrode comprised of copper-tungsten material.

13. A welding electrode assembly for welding nuts or studs to sheet metal, said assembly comprising:
 a tubular electrode housing having first and second ends spaced longitudinally from one another, a central longitudinally extending opening and a locator pin slideably supported within said central opening, said housing having an annular cooling channel extending into said first end of said housing and open to said first end, and an integral wall portion having inlet and outlet passages extending longitudinally therethrough and communicating with said annular cooling channel at adjacent spaced locations therealong, said housing having a flow divider provided between said inlet and said outlet passages along said annular cooling channel and extending to said first end of housing to close off said channel to the flow of coolant in one direction from said inlet to said outlet while permitting the flow of coolant along said channel in the opposite direction; and
 a ring-shaped electrode having flat inner and outer surfaces and a central bore, said inner surface being seated in sealed relation on said first end of said housing such that said cooling channel is closed at said first end of said inner surface of said electrode to define a sealed passage for the flow of coolant from said inlet to said outlet in said one direction therealong for providing a continuous vortex flow of the coolant across said inner surface of said electrode.

* * * * *

UNITED STATES PATENT AND TRADEMARK OFFICE
CERTIFICATE OF CORRECTION

PATENT NO. : 5,471,029
DATED : November 28, 1995
INVENTOR(S) : Michael S. Simmons It is certified that error appears in the above-indentified patent and that said Letters Patent is hereby corrected as shown below:

Column 5, line, delete "cased" and insert therefor -- case --.

Column 5, line 18, delete "hyphenated" and insert therefor --primed --.

Signed and Sealed this

Ninth Day of April, 1996

Attest:

BRUCE LEHMAN

Attesting Officer

Commissioner of Patents and Trademarks